July 31, 1962  L. S. HAMER  3,047,339
WHEEL BALANCER
Filed Jan. 6, 1960 2 Sheets-Sheet 1
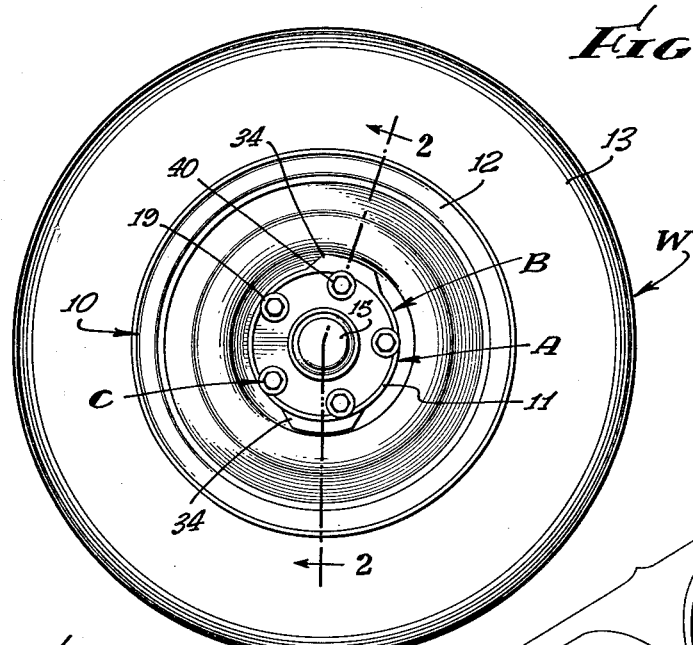
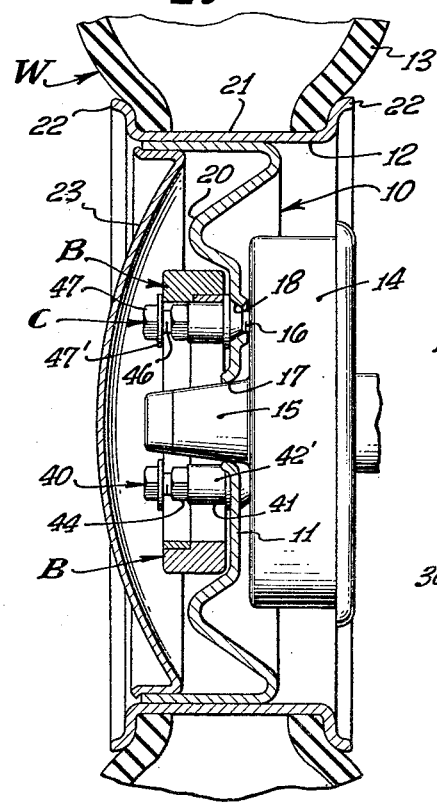
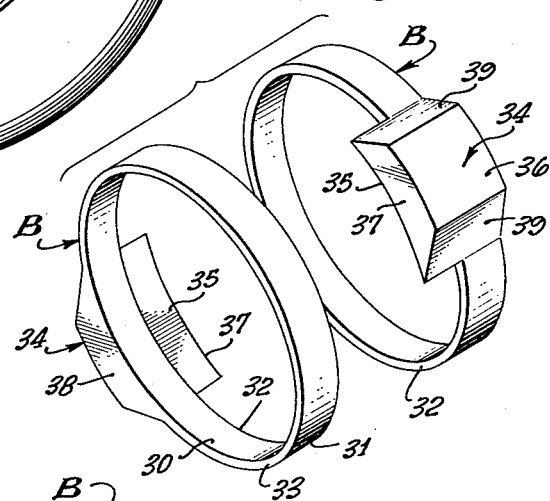
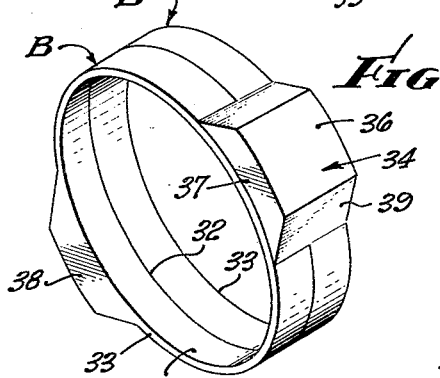
INVENTOR.
LELAND S. HAMER
BY
AGENT.

July 31, 1962 L. S. HAMER 3,047,339
WHEEL BALANCER
Filed Jan. 6, 1960 2 Sheets-Sheet 2
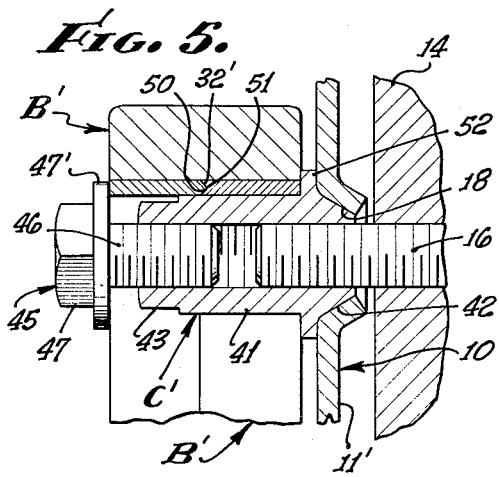
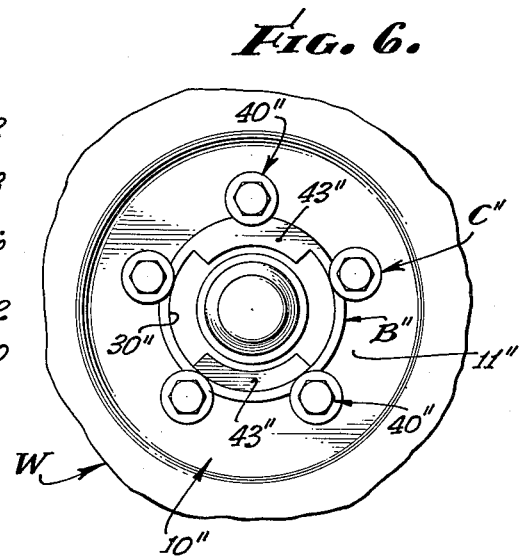
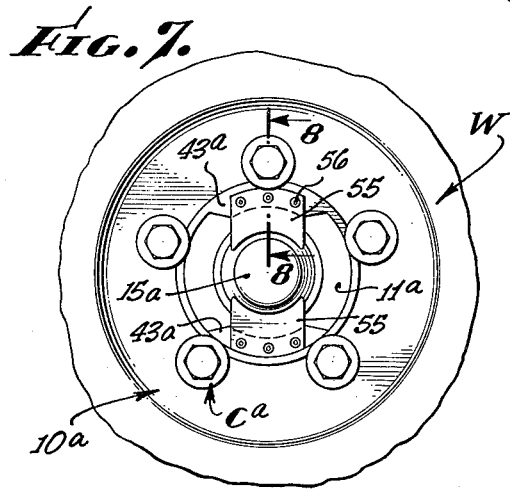
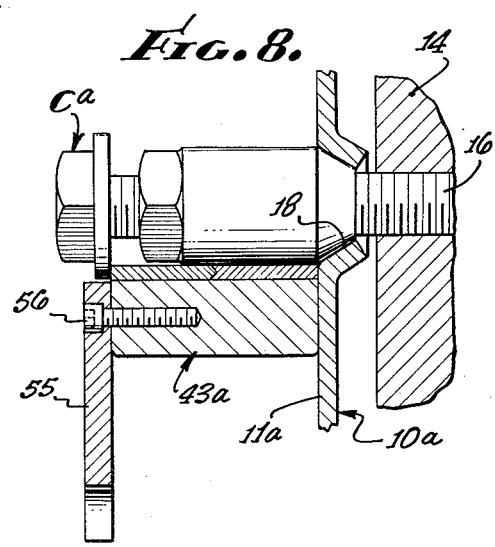
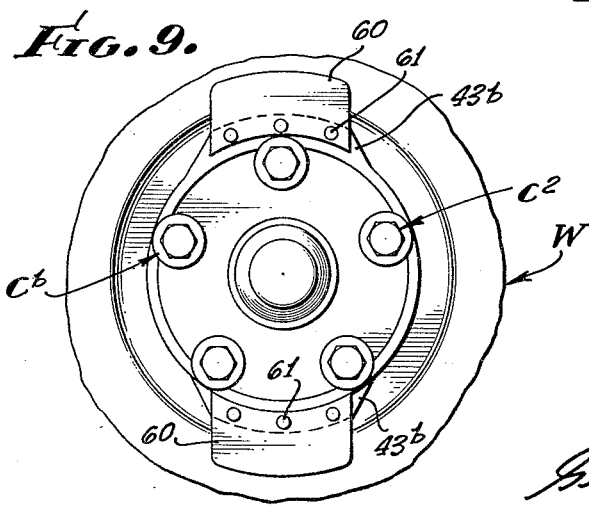
INVENTOR.
LELAND S. HAMER
BY
AGENT.

United States Patent Office 3,047,339
Patented July 31, 1962

3,047,339
WHEEL BALANCER
Leland S. Hamer, 4170 Lakewood Drive,
Lakewood, Calif.
Filed Jan. 6, 1960, Ser. No. 871
5 Claims. (Cl. 301—5)

This invention has to do with a novel balancing means and is more particularly concerned with a balancing means for use in connection with vehicle wheel assemblies.

Due to manufacturing imperfections, the ordinary vehicle wheel assembly is out of balance and is such that when it is in use and rolling on the road, it does not roll smoothly, but bumps and/or bounces along. This bumping and bouncing adversely affects the riding qualities of the car to which the wheel assembly is related, adversely affects the steering and braking characteristics of the car, causes uneven and rapid wearing of the tires and of the entire wheel suspension system of the car.

The unbalanced condition of the ordinary vehicle wheel assembly is normally the result of the wheel per se and/or the tire related thereto, being out of round, variations in the wall thickness of the tire and other similar situations which result in an uneven distribution of weight about the circumferential extent of the wheel assembly.

In the past, many attempts have been made to provide means for satisfactorily balancing vehicle wheel assemblies, but each has had one or more serious shortcoming.

The most common and widely used method for balancing wheel assemblies consists of applying lead counterbalance weights to the outer rim of the wheel. The lead weights are provided in several fixed weights, as, for instance, 1, 2, 3 and 4 ounces, and have metal clips which are pinched into tight engagement with the rim by a special pliers-like tool.

The difficulty with this common method of balancing wheels resides in the fact that the weights are exposed and unsightly, they are subject to becoming loose and displaced due to the fact that they are engaged on the rims of the wheels, and while they might approach balancing the wheel dynamically, they upset the balance of the wheel statically.

Ordinarily, static balance of ordinary wheel is not too far off and is not so critical as the dynamic balance thereof, with the result that little, if any, attention to static balance is necessary. However, when balancing a wheel dynamically, as by the application of lead weights to the rim of the wheel on a plane offset from the central, vertical plane of the wheel, the static balance is upset and, frequently, to a critical degree. No practical means has yet been found to remedy this situation.

Due to the tendency for rim weights to become loose and fall onto the pavement, where they may damage the tires of other vehicles, or to be cast from the wheel when rotating at a high rate, thereby constituting an extremely dangerous missile subject to creating serious damage, laws have been passed requiring that such weights be used but once, and that they be disposed of or scrapped should they have to be removed from the wheel or shifted, as when the tire is changed or rebalancing of the wheel becomes necessary.

As a result, rim weights, apart from being only partially satisfactory in balancing a wheel, are dangerous and are extremely costly when it is considered that wheels should be checked or balanced every 25,000 miles, and that ordinarily some correction is required at such time due to normal tire wear.

Other attempts to balance wheel assemblies have included the provision of a pair of counterbalance weights and means fixed to the wheels and carrying the weights for relative circumferential shifting and adjustment. This general method of balancing wheels has proven to be more effective than rim weights, since fine adjustment can be obtained by suitably shifting the weights. The difficulty or disadvantage with this method resides in the means employed to carry or support the weights and the means employed to secure the weights on the support or carrier means.

The support or carrier means employed in this method of balancing have consisted of costly, complicated annular frameworks, or the like, secured to the wheels to project therefrom so as to hold the weights spaced from and clear of the wheel, and so as to permit them to be shifted easily and freely. The means employed to secure the weights to the frames have included especially constructed, screw-actuated fastener and clamping means which, in addition to being costly, are subject to becoming loose with resulting failure of the entire set-up to which they are related.

While this last discussed method of balancing wheels is far superior to the rim weight method, it has, due to the complicated means employed in carrying it out, been extremely costly. Further, due to the manner in which the weights are supported, in spaced relationship to the wheels, problems of static balance, as found in the rim weight method, still exist.

An object of my invention is to provide a novel wheel assembly balancing apparatus applicable to a vehicle wheel and including a pair of axially aligned, circumferentially shiftable balance rings.

Another object of my invention is to provide a balance ring assembly having two like balance rings, each having a radially and axially offset enlargement, and arranged so that the enlargement on each ring overlies the other ring and so that the pair of rings are statically balanced.

A further object of my invention is to provide a novel means for securing the ring assembly on the wheel with which it is related in tight clamped engagement thereon, concentric therewith.

It is a further object of my invention to provide a device of the character referred to which occurs behind and is obscured by the hub cap normally provided on such wheels and which is such that it can be applied to any standard wheel construction without the necessity of rebuilding or otherwise modifying the wheel.

It is a general object of my invention to provide a wheel balancing device of the general character referred to which is easy and economical to manufacture and a device which is highly effective and dependable in operation.

The various objects and features of my invention will be fully understood from the following detailed description of typical preferred forms and applications of my invention, throughout which description reference is made to the accompanying drawings, in which:

FIG. 1 is an elevational view of a wheel assembly with my new balancing device applied thereto;

FIG. 2 is an enlarged detailed sectional view of a portion of the structure shown in FIG. 1, taken as indicated by line 2—2 on FIG. 1;

FIG. 3 is an exploded perspective view of a pair of balance rings provided by the present invention;

FIG. 4 is a perspective view of a pair of assembled balance rings as provided by my invention;

FIG. 5 is an enlarged detailed sectional view of a modified form of mounting means;

FIG. 6 is an elevational view of another form of my invention;

FIG. 7 is an elevational view similar to FIG. 6 showing supplemental weights applied to the rings;

FIG. 8 is a sectional view taken as indicated by line 8—8 on FIG. 7; and

FIG. 9 is an elevational view of the first form of the invention, with supplemental weights applied thereto.

The wheel balancing device A that I provide includes, generally, two like, oppositely disposed, axially aligned and relatively rotatable balance rings B, and clamp means C adapted to secure the ring assembly in fixed position on a wheel assembly W, concentric therewith and adjacent the central vertical plane thereof.

The wheel assembly W with which my new balancing device is related is a conventional automobile wheel assembly and includes a wheel 10 having a central vertically disposed disc portion 11 and a radially outwardly opening U-shaped rim portion 12 about the disc portion, and a pneumatic tire 13 engaged with and extending about the rim portion.

In accordance with normal automobile construction, the wheel assembly is mounted on a brake drum 14 having a flat outer wall, a central outwardly projecting conical bearing housing 15, and a plurality of circumferentially spaced outwardly projecting, threaded wheel studs 16.

The central disc portion 11 of the wheel 10 is provided with a central opening 17 to cooperatively receive the bearing housing 15 on the brake drum, and a plurality of circumferentially spaced openings 18 adapted to freely receive the wheel studs 16.

The openings 18 are axially inwardly convergent to cooperate with suitable self-centering wheel nuts 19 engaged on the studs and having axially inwardly convergent or tapered inner ends.

The central disc portion of the wheel is adapted to be centralized and held in tight clamped engagement on the outer face or wall of the brake drum by the wheel nuts 19.

The disc portion 11 of the wheel 10 is essentially a flat, vertically disposed portion. However, in practice, and as illustrated, it is suitably contoured as at 20 and outward of the openings 18 to reinforce and stiffen the construction.

The U-shaped rim portion 12 of the wheel 10 is of considerable axial extent, having an elongate axially disposed central portion 21 and radially outwardly projecting tire-retaining flanges 22 at each end of the central portion.

The plane of the central disc portion 11 occurs intermediate the ends of the central portion 21 of the rim and, therefore, on the central vertical axis of the wheel.

The central disc portion 11 and rim portion 12 of the wheel 10 are, generally, established separately and are suitably secured and fixed together to form a unitary structure, substantially as illustrated in FIG. 2 of the drawings.

In addition to the foregoing, the wheel assembly further includes a suitable hub cap 23, which cap is engaged within the rim portion 12 of the wheel 10 outward of the disc portion 11, to obscure the said disc portion, and the studs, nuts and bearing housing related thereto.

The wheel assembly and the other structure related thereto, set forth above, is standard or conventional and varies slightly, and only in insignificant details, so far as the instant invention is concerned, in the several major makes of cars.

The balancing rings B are alike and each includes a tubular body having straight, cylindrical, axially disposed inner and outer walls 30 and 31, and flat, radially disposed, inner and outer end walls 32 and 33. Each ring further includes an enlarged mass or counterbalance weight 34, which weight extends circumferentially of the ring and projects radially outwardly and axially inwardly relative thereto.

The weight 34 on each ring is a semi-circular metallic part having circular inner and outer walls 35 and 36, inner and outer end walls 37 and 38, and side walls 39. The weight is twice the axial extent of the ring and is equal in inside radial extent with the outside radial extent of the ring.

The weight 34 can vary substantially in circumferential extent and for the purpose of illustration is shown as extending circumferentially about 65°. The side walls 39 can be radially disposed or can, as shown, be inclined.

The weight 34 is secured to the ring with the inner wall 35 thereof in mating engagement with the outer wall 31 of the ring, and with its outer end flush with the outer end of the ring.

With this relationship of parts, it will be apparent that the weight projects radially outwardly from the ring and the inner end portion of the weight projects axially inwardly from the inner end of the ring a distance equal to the axial extent of the ring.

In practice, the weight can be a separate part secured to the ring, as by means of suitable fasteners or welding, or can, as illustrated, be formed integrally therewith.

The pair of rings going to make up my new device is arranged with the inner end 32 of each ring in opposed sliding engagement with the other, and with the inner end portion of the weight 34 on each ring extending over the other ring, with its inner wall 35 establishing sliding, bearing engagement on the outer wall 31 of said other ring.

The weights 34 must, as will be apparent, be offset from each other circumferentially of the assembly, to permit proper interengagement of the rings.

It will be further apparent that the inner end 37 of each weight 34 is flush with the outer end 33 of the other ring with which it is related.

From the foregoing, it will be apparent that the ring assembly that I provide is dynamically out of balance except when the weights are positioned at exactly diametrically opposite sides of the assembly, and that the extent of this unbalanced condition can be varied and controlled materially by shifting the rings, with their weights, circumferentially relative to each other.

It will be further apparent that the ring assembly is statically balanced, by virtue of the overlapping relationship of the weights and rings.

It is to be noted that the inner walls or surfaces 35 of the weights 34 embrace the outer walls 31 of the rings and serve to hold and maintain rings in axial alignment.

The clamp means C that I provide for securing the rings in fixed position and on the wheel W includes, a plurality of nut units 40 adapted to replace all or part of the wheel nuts 19 and to be threaded onto the studs 16.

Each unit 40 includes an elongate, internally threaded, nut member 41 having inner and outer ends. The inner end of the member 41 is tapered, as at 42, to cooperatively engage and seat in the tapered openings 18 in the wheel. The member 41 is of slightly less axial extent than the ring assembly and is provided with a cylindrical outer wall 42 throughout the greater part of its longitudinal extent and is provided with tool engaging flats 44 about its outer end portion. There are preferably six flats cooperating to establish what is, in effect, a hexagonal nut corresponding in cross-sectional dimensions with the standard wheel nut which the unit replaced and which can be advantageously engaged by a standard wheel wrench.

The members 41 are adapted to be threadedly engaged on the stubs 16 to which they are related to cooperate with and hold the wheel in tight clamped engagement on the brake drum 14 in the same manner as a conventional wheel nut.

The members 41 are of such diametric extent that their outer walls 42' occur tangential with and slidably engage the inner walls 30 of the rings B and serve to orient and maintain the ring assembly in axial alignment with the wheel.

Each unit 40 of the means C further includes a bolt member 45 having an elongate, inwardly projecting, threaded shank 46 threadedly engaged in the nut member 41 and an enlarged polygonal or hexagonal head 47 at its outer end, which head is of sufficient diametric extent to engage the outer end of the outermost ring B of the ring assembly and to hold the rings in tight clamped engagement with each other and in tight clamped engagement with the disc portion 11 of the wheel 10.

In the preferred carrying out of the invention and as illustrated in the drawings, the heads 47 of the bolt members 45 are the same in outside cross-sectional configuration as the standard wheel nuts 19, so that only one size wrench is required to assemble and adjust the device, and is provided with a radially outwardly projecting clamping flange 47′ to engage the ring assembly.

Five studs 16 and five nuts 19 are provided in conventional wheel construction. In carrying out the present invention, at least two of the standard or conventional nuts 19 are replaced with nut units 40, such as are referred to above.

Since the nut units 40 are of considerably greater mass than the standard nuts which they replace, by selectively positioning a lesser number of nut units than it is possible to use, as, for instance, 2, 3 or 4 of such units, an initial balancing effect can be obtained before the ring assembly is applied and adjusted to achieve full and proper balance.

With the structure set forth above, it will be apparent that by shifting the weights 34 on the rings circumferentially relative to each other and relative to the wheel assembly B, the wheel can be advantageously dynamically balanced. The balancing device is capable of extremely fine adjustment and is such that the wheel to which it is related can be, in effect, turned into perfect dynamic balance.

It will also be apparent that the entire device is of limited axial extent and is arranged wholly within the rim portion 12 of the wheel 10 and adjacent the flange portion 11 of the wheel, which portion of the wheel occurs on the central vertical axis of the wheel assembly, to the end that the device affects the static balance of the wheel to a minimum and negligible extent.

Further, it will be apparent that the entire device is arranged within the wheel structure so that it is protected thereby and is not subject to being damaged or placed out of adjustment as a result of the wheel assembly being brought into engagement with a curb stone, or the like, and is such that it does not interfere with and is advantageously obscured by the hub cap 23 related to the wheel.

Also, should any part, member or element of the device come loose, it is retained by the hub cap and is not subject to becoming lost or deposited on the road to create a hazard.

In the form of the invention shown in FIG. 5 of the drawings, the rings are not alike. The inner end 32′ of one of the rings is provided with an annular, V-shaped groove 50, and opposing inner end 32 of the other ring is provided with an annular V-shaped projection 51 which is cooperatively engaged in the groove 50 of the first-mentioned ring.

With this relationship of parts, the rings B are suitably interengaged about their entire peripheral extent and are not subject to being shifted radially relative to each other under any circumstances.

This construction is considered advantageous where less than five clamping units are employed and where the rings are formed of a metal which might otherwise not withstand the forces encountered when the wheel assembly is rotated at an extremely high speed.

The clamping unit of the means C′ in the form of the invention shown in FIG. 5 distinguishes from that shown in the first form of the invention by the provision of a mounting flange 52 on the unit member 41 to occur between the disc portion 11′ of the wheel and the innermost ring B′ of the ring assembly.

The flange 52 in this form of the invention serves to support the ring assembly in spaced relationship to the wheel and may be employed in a situation where the disc portion 11′ of the wheel is not flat or even and does not provide a suitable surface upon which the ring assembly can be clamped.

The third form of the invention shown in FIG. 6 is substantially the same as that shown in FIG. 1, except that the weights 43″ are arranged to occur on and project from the inner peripheral walls 30″ of the rings B″ and the units 40″ of the means C″ occur about the outer periphery of the ring assembly.

This form of the present invention may be provided in special circumstances where the configuration of the disc portion 11″ of the wheel 10″ is such that sufficient space is not available between the clamp means C″ and the wheel structure radially outwardly thereof to accommodate the ring assembly.

The fourth form of the invention shown in FIGS. 7 and 8 of the drawings is similar to that shown in FIG. 6 and, further, includes supplemental weights 55 secured to the ends of the weights $43^a$, remote from the disc portion $11^a$ of the wheel $10^a$, by means of suitable screw fasteners 56.

The weights 55 are simple, flat plates secured to the weights $43^a$ to project radially inwardly therefrom so as not to interfere with the means $C^a$ and are suitably contoured to clear the bearing housing $15^a$ of the wheel.

The weights 55 are employed where extreme out-of-balance conditions exists, and where the mass of the weight $43^a$ are not sufficient.

The form of the invention shown in FIG. 9 of the drawings is similar to the first form of the invention and further includes supplemental weights 60, such as are provided in the last mentioned form of the invention.

The weights 60 are flat, plate-like units secured to the weights $43^b$ by means of screw fasteners 61, and project radially outwardly therefrom so as not to interfere with the clamping means $C^b$.

The weights 60 are applied only when the mass afforded by the weights $43^b$ is insufficient to counteract the unbalanced condition of a wheel with which the structure is related.

Having described only typical preferred forms and applications of my invention, I do not wish to be limited or restricted to the specific details herein set forth, but wish to reserve to myself any modifications or variations that may appear to those skilled in the art and fall within the scope of the following claims:

Having described my invention, I claim:

1. A balancing ring assembly including, a pair of rings, each having axially disposed inner and outer ends and a radially offset balance weight extending circumferentially about a portion thereof and projecting axially inwardly from the inner end thereof, said rings being arranged in axial alignment with their inner ends in opposed relationship and with the weight on each ring slidably engaging the other ring about a portion thereof, whereby the weight of each ring supports a portion of the other ring and maintains it in axial alignment therewith.

2. In combination with a vehicle wheel having a pneumatic tire mounted thereon, a central disc portion with a plurality of circumferentially spaced openings therein and receiving a plurality of circumferentially spaced wheel supporting studs on a brake drum with which the wheel is related including, a plurality of clamp units engageable with the studs and each including an elongate, internally threaded nut member engaged on a stud to hold the wheel in fixed engagement on the brake drum, and a bolt member having a shank threaded into the end of the nut member remote from the wheel and having an enlarged radially outwardly projecting head, a balancing ring assembly including a pair of rings, each having axially disposed inner and outer ends and a radially offset balance weight extending circumferentially about a portion thereof and projecting axially inwardly from the inner end thereof, said rings being arranged in axial alignment with their inner ends in opposed relationship and with the weight on each ring slidably engaging the other ring about a portion thereof, whereby the weight of each ring supports a portion of the other ring and maintains it in axial alignment therewith and said ring assembly being positioned adjacent said wheel in axial alignment therewith and in sliding engagement with said nut members, said heads on the bolt members engaging the outer end of the ring remote from the wheel to hold the rings in fixed rotative position and in tight clamped engagement on the wheel.

3. A balancing ring assembly as set forth in claim 1 wherein the inner end of one ring has an axially inwardly opening annular groove and the inner end of the other ring has an axially inwardly projecting annular rib slidably engaged in the groove in the said one ring.

4. A balancing ring assembly as set forth in claim 1 including a flat radially disposed supplemental weight releasably secured to the inner end of the weight on one of said rings and a flat radially disposed supplemental weight releasably secured to the outer end of the weight on the other ring, said supplemental weights projecting radially from the weights and the rings.

5. A vehicle wheel comprising, in combination: a wheel supporting drum having a plurality of circumferentially spaced studs projecting axially therefrom; a wheel having a central disc supported on said studs; a plurality of clamp units engaged with at least certain of said studs; each clamp unit including an elongated internally threaded nut engaged on its stud to hold said wheel on said drum; clamping means carried by each clamp unit; a bearing ring assembly concentrically disposed relative to said drum on said clamp units and releasably clamped by said clamping means; said bearing ring assembly including a pair of rings respectively provided with bearing weight portions movable circumferentially relative to the bearing weight portion of the other ring upon release of said clamping means.

References Cited in the file of this patent
UNITED STATES PATENTS

| | | |
|---|---|---|
| 2,216,308 | Ballman | Oct. 1, 1940 |
| 2,426,400 | Lampton et al. | Aug. 26, 1947 |
| 2,927,821 | Palmer | Mar. 8, 1960 |